United States Patent [19]
Jonason et al.

[11] 3,709,565
[45] Jan. 9, 1973

[54] METHOD AND ARRANGEMENT FOR ELECTRONIC CONTROL OF THE BRAKING MEANS OF WHEELED VEHICLES

[75] Inventors: Arne Holger Jonason, Angered; Gosta Holger Granlund, Goteborg, both of Sweden

[73] Assignee: Saab-Scania Aktiebolag, Linkoping, Sweden

[22] Filed: Oct. 26, 1970

[21] Appl. No.: 83,747

[30] Foreign Application Priority Data
Oct. 27, 1969 Sweden ............................. 14652/69

[52] U.S. Cl. .............. 303/21 BE, 188/181 C, 303/10, 303/21 F, 317/5
[51] Int. Cl. ................................................. B60t 8/08
[58] Field of Search ............ 188/181; 303/20, 10, 21; 317/5; 318/52; 324/160–161; 340/263

[56] References Cited

UNITED STATES PATENTS

| | | | |
|---|---|---|---|
| 3,586,387 | 6/1971 | Riordan et al. | 303/21 BE UX |
| 3,401,984 | 9/1968 | Williams et al. | 303/21 BE |
| 3,498,682 | 3/1970 | Mueller et al. | 303/21 BE |

FOREIGN PATENTS OR APPLICATIONS 1,953,253  6/1970  Germany .............................. 303/21 P

*Primary Examiner*—Milton Buchler
*Assistant Examiner*—Stephen G. Kunin
*Attorney*—Pierce, Scheffler & Parker

[57] ABSTRACT

In a motor car or other wheeled vehicle provided with electronically controlled wheel brakes, the lag or slip of the individual wheels is determined to render possible a control such that locking and skidding of the wheels is prevented. During braking, the brake of one wheel of the vehicle is intermittently released so that the wheel is intermittently free-running without slip. The speed of the vehicle is continuously measured by an accelerometer of simple type and an integrator integrating the accelerometer output. The true speed of the vehicle is intermittently measured by a speed transducer associated with said wheel and having an output representative of true speed during the free-running interval of the wheel. The approximate continuous speed value is recurrently updated by the intermittent true speed signal so that the integrator output is proportional to the ratio of the speed of the vehicle to that of the wheel and is a quantity to control the brake of the wheel in dependence of the slip of the wheel by comparison with a permissible or tolerable slip limit value.

2 Claims, 6 Drawing Figures

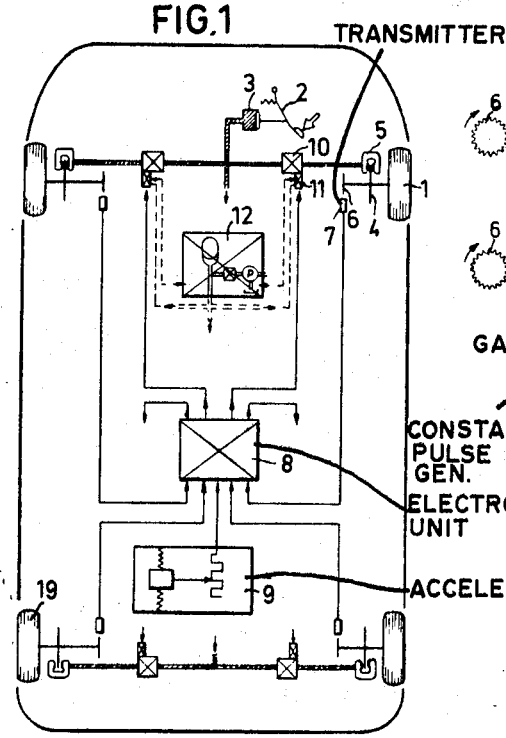
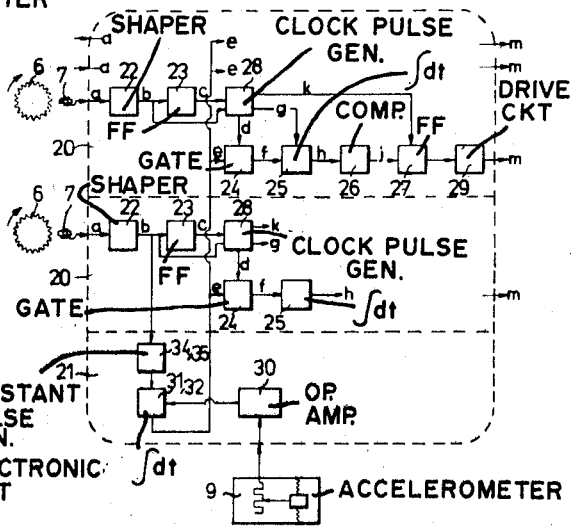
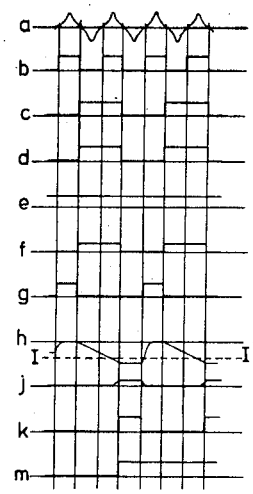
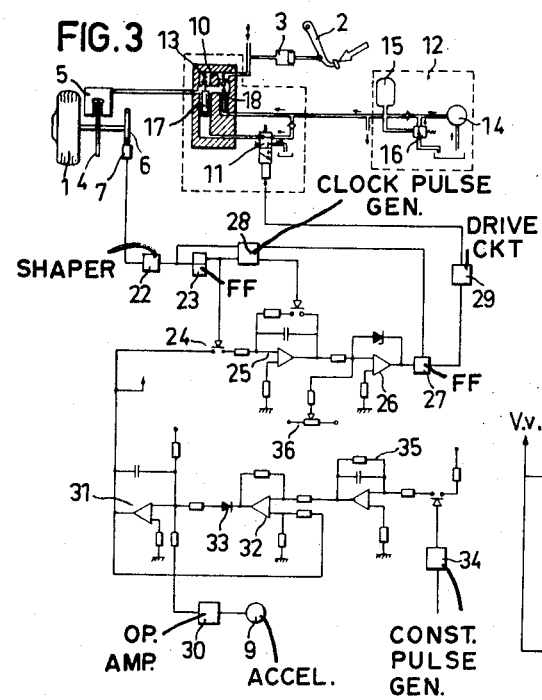
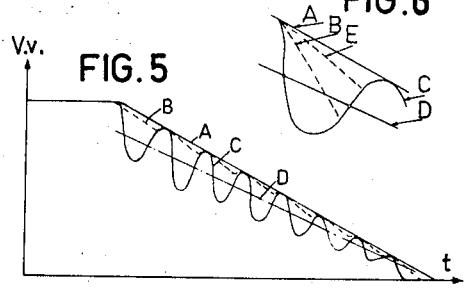
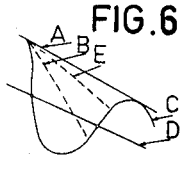

METHOD AND ARRANGEMENT FOR ELECTRONIC CONTROL OF THE BRAKING MEANS OF WHEELED VEHICLES

The present invention is related with an electronic control system for braking means of a wheeled vehicle and comprises a method and an arrangement for indicating the slip or lag of a wheel of the vehicle during braking to control, in dependence thereon, the braking effect of the wheel such that locking of the wheel is prevented.

When braking a vehicle the well known problem arises that an excessive braking torque applied to individual wheels of the vehicle results in skidding of the wheel because the frictional force at the area of engagement with the surface of the road is overridden so that the braking horsepower of the wheel decreases and the steering stability is wholly or partially lost. The problem is particularly difficult because the braking efficiency of the wheels and of different individual wheels of the vehicle is dependent on many various factors. Thus, the braking horsepower or efficiency is dependent on the actual conditions of the road, road stability, weather, characteristics of the respective wheels, speed, wheel load, temperature etc. For each combination of such conditions the braking efficiency may be represented by a characteristic curve showing the braking force of the wheel as a function of the slip $s$ of the wheel, the relationship being $s = (V-v)/V$ wherein $V$ is the speed of the vehicle and $v$ is the circumferential speed of the wheel. The curve is characterized in that the braking power exists only if the slip differs from zero. With increasing slip, the braking power increases to a maximum and then decreases again. Thus, the slip of every individual wheel of the vehicle should be such that it corresponds to the maximum braking efficiency under prevailing conditions to render a substantially optimal braking capacity of the vehicle.

Control systems of the above type are known and are frequently used to prevent skidding of the landing wheels of aircraft. Such brake control systems tending to achieve optimal braking require, however, a very expensive and intricate electronic equipment so that application thereof for other types of wheeled vehicles, particularly motor cars, would be unrealistic.

It is an object of the invention to make possible with simple means an electronic control system for brake means of wheeled vehicles, which system approximately determines the instantaneous slip of a wheel and accordingly controls the brake function of the wheel with respect to a predetermined slip limit, the invention being substantially related with a method and arrangement for indication of the slip of a wheel of the vehicle during braking to control, in dependence thereon, the braking power of the wheel such that locking of the wheel is prevented.

The method according to the invention is substantially characterized in that information of the instantaneous speeds of the vehicle and of the wheel is supplied in the form of electrical magnitudes to a block included in an electronic unit. This block includes both an analogue gate and an integrator to integrate the electrical signal representing the speed of the vehicle. Such integration takes place during the period between two edges of the pulses which represent the speed of the wheel and are generated by a speed sensor such as an inductive (magnetic) transmitter. Thus, the input of the integrator is a voltage $U_i = K_1 V$ wherein $V$ is the predicted speed of the vehicle and $K_1$ is a constant, which input voltage lasts during a period $T = K_2/v$, wherein $v$ is the actual speed of the wheel and $K_2$ is a constant. Consequently, the output of the integrator will be $U_u = K_i K_1 K_2 V/v$ wherein $K_i$ is a constant and the output $U_u$ is proportional to the ratio of the speed of the vehicle to that of the wheel. The numerator of this ratio is digital whereas the denominator is analogue, and the ratio is dependent on the slip of the wheel and controls the braking of the wheel.

The arrangement according to the invention is substantially characterized by an electronic unit including a block which has an analogue gate and an integrator integrating the input during intervals conditionally controlled by the analogue gate, said input representing the predicted speed of the vehicle during the period between two pulse edges of pulses, which pulses represent the speed of the wheel and are generated by a speed sensor such as an inductive (magnetic) transmitter and are applied to the analogue gate. The input $U_i$ and the output $U_u$ of the integrator as well as said ratio are as defined in the preceding paragraph.

It is previously known to combine signals representing the respective speeds of a wheel and of a vehicle, but such that the difference of the two speeds is the criterion of the slip limit and is used as a brake control between two predetermined limit positions. According to the invention, however, the braking effect of an individual wheel is indicated by forming a ratio having an analogue numerator and a digital denominator, this ratio closely following values of comparison of the instantaneous slip of the wheel before the wheel is locked and, thus, being a fully acceptable magnitude for the brake control.

For executing the method according to the invention the digital signal representing the speed of the vehicle must be closely equivalent to the true speed of the vehicle during braking.

If the speed of the vehicle is measured by means of one wheel and, for example, an inductive transmitter, it is normally required that said wheel be free-running during braking, and such measure involves some limitation from the view of braking. According to another possibility to the same effect, a braked wheel may be intermittently released to become intermittently free-running and, thus, to make possible a measurement of the true vehicle speed, and the speed values obtained in this way are accumulated in a store or memory. However, the latter method results in incorrect control signals because comparison values of the speed of the vehicle only temporarily correspond to the true speed of the vehicle, the vehicle normally being a motor car.

It is also known to measure the speed of the vehicle by means of an accelerometer output. This method is well tried and results in reliable speed values provided that the accelerometer is of high quality. It is unthinkable, however, to introduce such an intricate and expensive instrument into a control system for the brake means of, say motor cars.

In consideration of the above, the arrangement according to the invention is equipped with a simple type of accelerometer, the output of which is integrated by an integrator and, thus, represents the speed of the vehicle. As the speed information obtained from such an integrated accelerometer output may be incorrect, the information is updated by signals representing the speed of an intermittently free-running wheel of the vehicle, which wheel is referred to below as the reference wheel and has a lower predetermined slip limit than the other wheels of the vehicle. A vehicle speed updated in this way follows, apart from only slight deviations, the true speed of the car in every phase of the braking period. The accelerometer is preferably arranged never to give an information of lower retardation than the true retardation of the motor car.

Further objects and features of the invention are explained below with reference to the accompanying drawings, wherein FIG. 1 is a schematical top view of a control system installed in a motor car, FIG. 2 shows the logical circuit of the control system, FIG. 3 shows the block diagram of the electronic unit in more detail, FIG. 4 is a diagram of waveforms in the circuit shown in FIG. 2, and FIG. 5–6 is a diagram illustrating how an updated speed signal instantaneously follows the true vehicle speed during a typical braking procedure.

The control system shown and described by way of example is adapted to a motor car provided with a hydraulic brake system of known function wherein the wheels 1 of the vehicle are subjected to a braking torque by a force acting on a brake pedal 2. Normally, this force is mechanically amplified by a servomechanism, and a hydraulic pressure produced in the brake system is applied through a main cylinder 3 to the brake cylinders (not shown) of the individual wheels where a further conversion of the brake power takes place before the proper brake elements of the respective wheels 1 are actuated. In FIG. 1 the brake elements substantially consist of brake calipers 5 attached to the vehicle and carrying brake shoes for co-operation with a brake disc 4, the brake shoes being controlled by the brake cylinder.

It is an object of the control system according to the invention to make possible an individual control of the brake power of each individual wheel of the vehicle so that a predetermined slip limit is substantially maintained during braking. Consequently, it must be possible to measure the speed of the vehicle and of each individual wheel when braking occurs. For such measurement of the speed of the wheels, each wheel 1 is provided with a toothed disc 6 fixed to the wheel and cooperating with a stationary inductive (magnetic) transmitter 7 adjacent to the disc 6 to generate an electrical pulse a for every tooth passing by the transmitter 7. The repetition frequency of a pulse train generated in this way represents the angular velocity of the wheel 1.

Said pulses a form the input of a common electronic unit 8 which also receives a signal representing the retardation of the vehicle during braking. The retardation is sensed by a conventional accelerometer 9 mounted in the vehicle, the operation of the accelerometer being dependent on mechanical forces of inertia which are converted into electrical signals such as voltages when the speed varies.

The applied input information of wheel speeds and retardation of the car are processed by the electronic unit in a manner characteristic for the invention and described below, and then the electronic unit 8 indicates an electrical magnitude being proportional to the instantaneous lag or slip of the wheel 1. With the chosen embodiment of the control system said magnitude is converted into a signal $m$ becoming a logical "one" or "zero" dependent on the relative position of the indicated magnitude relative to a magnitude corresponding to a predetermined slip limit. An output signal $m$ of the electronic unit 8, being processed in this way, controls a solenoid valve 11 which is connected to a control element 10 controlling the brake power of the associated wheel 1 and being fixed to the vehicle.

When said output represents a logical one involving that the instantaneous slip of the wheel exceeds the predetermined slip limit, the solenoid valve 11 opens a brake fluid path from a hydraulic aggregate 12 to the control element 10, and the communication between the main cylinder 3 and the wheel brake cylinder is interrupted, so that the braking power of the wheel brake cylinder is reduced and the speed of the wheel increases. When, then, the predetermined slip limit of the associated wheel is gradually reached as a consequence of said operation, the polarity of the output $m$ of the electronic unit is changed, whereby the communication between the hydraulic aggregate 12 and the control element 10 is shut off by a retracting spring 13 located in the control element 10. Thus, the braking force increases and the speed of the wheel decreases. When the predetermined slip limit is passed again, the output of the electronic unit 8 becomes a "one" and the above operation is repeated. Thus, the wheel 1 is subjected to an intermittent or pulsing braking which oscillates about a slip limit value predetermined for the concerned wheel.

The hydraulic aggregate 12 includes a pump 14 driven by the crankshaft of the motor of the car, and a pressure accumulator 15 and a regulator 16 remove the load of the pump 14 when the accumulator 15 is charged. The hydraulic aggregate 12 as well as its function is well known and need not be described in more detail.

The control element 10 controlling the pressure of the brake fluid of the wheel brake cylinder consists of a shut-off valve combined with a cylinder 17 for smoothing of variations of volume, and also of a relief valve 18. The control element 10 allows for controlling the braking pressure or brake power from zero to maximum with a constant fluid volume enclosed between the control element 10 and the wheel brake cylinder. If, for one reason or another, the operation of the control system is interrupted, it does not interfere with the operation of the conventional brake system. Within the frame of the invention the control element may be worked out in a plurality of different forms which need not be described in the present specification.

As mentioned more above, the retardation of the car is sensed by the accelerometer 9 during braking, and the output of the accelerometer is applied to the electronic unit 8 which integrates the value of said output so that the resulting signal represents the speed of the vehicle. The retardation output of an accelerometer of a simple type as well as the integration thereof is impaired by errors so that the speed represented by the integrated signal normally differs from the true speed of the vehicle as may be seen from FIG. 5. This error is reduced to a permissible value by updating the speed-representing signal during braking. For this purpose one of the wheels of the vehicle, preferably the left rear wheel, forms a reference wheel 19 and is intermittently released to become free-running. The top speed measured during free-running is the initial value of the vehicle speed at the beginning of each cycle of prediction.

A criterion of the condition that the speed of the released reference wheel actually increases to the true speed of the motor car may be selected along different lines. With the present embodiment of the control system according to the invention described by way of example, the chosen method consists in that the braking power of the reference wheel 19 is reduced down to a lower predetermined slip limit than that of the remaining wheels 1. Owing to this lower slip limit the braking action of the reference wheel 19 is lower than that of the other wheels 1. This lower slip limit results in a reduction of the brake horsepower of the reference wheel 19, but such reduction need not be an essential disadvantage as the reference wheel is a rear wheel which normally attributes less to the total braking capacity than a front wheel.

The electronic unit 8 is adapted to the arrangement according to the invention and to the underlying method and comprises a number of blocks 20 of electrical circuits for individual control of each separate wheel 1, 19 of the vehicle and a common block 21 of electrical units for measuring the speed of the vehicle. For the purpose of illustration, FIG. 2 shows the logical diagram divided in three fields. The upper field in FIG. 2 shows the electrical circuits of a block 20 forming calculating means for the control of each individual wheel. The intermediate field indicates the corresponding circuits of the block associated with the reference wheel 19 and shows also how said block 20 is connected to the common block 21 illustrated in the lowermost field of FIG. 2. Each separate circuit of the respective blocks 20, 21 forms a known basic component having known functions in electronics so that the description below is concerned only with the functional interrelationship of the various circuits of the shown control system.

The pulses $a$ from the inductive (magnetic) transmitter 7 of a wheel 1, 19 of the vehicle are supplied to the associated block 20 of the electronic unit 8, wherein the pulses a are converted by a pulse shaping circuit 22 into rectangular pulses $b$, normally referred to as square wave pulses. The pulses $b$ drive a frequency halving flip-flop 23 halving the pulse recurrence frequency such that the duration of the pulses is increased so that pulses $c$ are obtained. The pulses $c$ control an analogue gate 24 which switches conditionally the voltage signal $e$ to an integrator 25, the signal $e$ corresponding to the predicted vehicle speed. This voltage signal $e$ is switched on during an interval $T = K_2/v$, wherein $T$ is the duration of the interval, $v$ is the speed of the appropriate wheel 1, 19 and $K_2$ is a constant. The voltage corresponding to the speed of the vehicle is $U_1 = K_1V$, when $V$ is the speed and $K_1$ is a constant. Thus, the output of the integrator 25 is $U_u = K_iK_1K_2V/v$, wherein $K_i$ is a constant. Thus, the output of the integrator 25 is proportional to the ratio of the speed of the vehicle to that of the respective wheel 1, 19, this ratio being an approximative slip value. Normally, the ratio is constant irrespective of the vehicle speed, but when a wheel begins lagging under braking, the ratio of the speed of the vehicle and that of the lagging wheel will increase in accordance with the above equation.

An operational amplifier connected as a comparator 26 compares the output voltage of the integrator 25 with a predetermined adjustable level in the comparator. This level may, for example, be adjusted with a potentiometer 36 and is determined by that percentage of slip, which is tolerable before braking should be controlled. The output of the comparator 26 is a logical "one," when the output of the integrator 25 is below said level of the comparator, and is a logical "zero" when the output of the integrator exceeds the level. The output of the comparator 26 is connected to the so-called D input (signal input) of a memory flip-flop 27 which transfers the D input signal to the output of the flip-flop only when a clock pulse is supplied to another input of the flip-flop 27 from a logical circuit 28. A signal transferred in this way to the output of the flip-flop remains stored at this output and forms the control signal transmitted by the electronic unit 8 after having passed a drive circuit 29 being an amplifier.

The output $j$ of the integrator 25 varies during a computing operation, and also the output $m$ of the comparator 26 varies during such operation. Thus, the control signals must not be transmitted before a calculation is sequentially finished. This action is controlled by clock pulses $k$ supplied from the logical circuit 28 to the memory flip-flop 27. The clock pulses $k$ initiate the transmission of signals from the D input to the output of the flip-flop 27 provided that the input has another value than the stored output.

Every second pulse $a$ from the wheel 1, 19 releases a clock pulse $k$ in the logical circuit 28 formed by a combination of gates, the clock pulses being produced by combining and integrating input pulses $b$ and $c$ from the pulse shaping circuit 28 and the frequency divider 23. In the same way the logical circuit 28 generates also pulses $g$ for resetting the integrator 25 after a reading (writing) to the memory flip-flop 27.

FIG. 4 shows the pulses and other signals of the control system as a function of time as follows:

$a$ — pulses from inductive transmitter 7 to the pulse shaper 22

$b$ — pulses from pulse shaper 22 to frequency dividing flip-flop 23, to logical circuit 28 and to common block 21 for updating of speed $c$ — pulses from frequency divider 23 to analogue gate 24

$d$ — pulses from logical circuit 28 to analogue gate 24

$e$ — predicted-speed signal from block 21 to gate 24

$f$ — signal from analogue gate 24 to integrator 25

$g$ — resetting pulse from logical circuit 28 to integrator 25

$h$ — output of integrator 25 to comparator 26

$j$ — output from comparator 26 to memory flip-flop 27

$k$ — clock pulse from logical circuit 28 to flip-flop 27

$m$ — control output of flip-flop 27.

It may be seen from FIG. 4 how the input pulses $b$ and $c$ of the logical circuit 28 are combined to generate the pulses $g$ and $k$ with defined intervals. It may further be seen that the signal representing the predicted speed of the vehicle may be considered constant and is supplied to the integrator 25 during the intervals between the pulse edges according to diagram d to produce the signal f. During said intervals integration occurs and is shown in diagram h by a right-angled triangular area which is located between the instants of the two edges of each pulse f, the tangent of the slope angle of the hypotenuse being proportional to the speed of the vehicle. As the horizontal side of the triangle represents time and is proportional to the speed of the considered wheel, the amplitude, i.e., the vertical smallest side of the triangle is proportional to the ratio of the speed of the vehicle to that of the wheel. The dashed line I—I indicated in the diagram h corresponds to a slip value level pre-set in the comparator 26 for the comparison, and the difference between the slip values and the level I—I results in a corresponding comparator output j to the memory flip-flop 27. In analogy to the description more above, timed clock pulses k are also applied to the flip-flop 27 so that the flip-flop passes the signal j during said clock pulses to its output where the signal j is stored until the input of flip-flop receives further information.

As described more above, the electronic unit 8 receives information of an estimated vehicle speed, obtained by integration of the accelerometer output, and by intermittent comparison of the accelerometer output, and by intermittent comparison of this output and of a signal representing the true vehicle speed in the common block 21 which is described in more detail with reference to FIG. 3.

The output of the accelerometer 9 is filtered and amplified by an operational amplifier 30, if the output represents a retardation. If not, the output is cut off. A retardation signal obtained in this way forms the input of an integrator 31 integrating the value of the signal so that the integrator output corresponds to the speed of the vehicle.

The integrator 31 forms part of a top follower which includes also an updating circuit connected to an amplifier, and a potential-sensing diode 33 between said circuit and the integrator 31. The top follower operates such that the output of the integrator 31 is compared with a signal representing the true vehicle speed at those times at which the true speed is available. For measurement of the true vehicle speed sensed at the reference wheel 19 when this wheel is free-running pulses a derived from this wheel 19 are reshaped in the pulse shaping curcuit 20 and are fed to a constant-pulse generator 34 included in the common block 21 of the wheels 1, 19, this block forming part of the electronic unit 8. The constant pulse generator 34 generates pulses of constant length (duration) but still at a frequency proportional to the speed of the wheel. The pulses are summed by a filter included in an amplifier 35 so that the output of this circuit corresponds to the top speed of the wheel 19 when free-running and, thus, equivalent to the true speed of the vehicle. The updating circuit 32 then compares the intermittent speed signal with the integrated accelerometer output representing the speed of the vehicle.

If the speed of the reference wheel 19 is lower than that measured by the accelerometer 9, in this example of the object of invention the integrator 31 does not receive any contribution from the amplifier 32, i.e., from the updating circuit, and the prediction of speed on the basis of the accelerometer output continues. When the speed of the reference wheel 19 increases, the amplifier 32 transmits an output through diode 33 to the integrator 31 such that the integrator output has a value involving that the predicted speed is equal to the speed of the reference wheel 19.

By recurrent correction of the signal of vehicle speed during braking, the signal can be caused closely to follow the true speed of the vehicle during braking, apart from fairly slight variations, and in this way it is possible to detect the instantaneous slip of the individual wheel 1 without more appreciable fluctuations. Consequently, a signal corresponding to the speed of the reference wheel 19 is used only as an updating information for the calculated speed of the vehicle by measuring the retardation, and as a consequence thereof, also the reference wheel 19 can be subjected to intermittent braking.

FIGS. 5–6 shows the updating principle in diagram form, the full line A showing the true speed of the vehicle during braking, and the dashed line B representing the integrated accelerometer output. Assuming that no updating were used in the present example, the line B would continue, seen from the left side in FIGS. 5–6, in the original direction, i.e., in the same direction as that in the beginning of the braking period, and would, thus, considerably differ from the line A representing the true vehicle speed.

The meandering line C shows the pulsating speed of the reference wheel 19 during braking, and the chain line D shows the predetermined slip limit of the wheel. In the present example, this slip limit is a constant percentage of fraction initiating a control of the brake means whenever the speed of the wheel passes through said limit.

In accordance with the basic idea of the invention, the top speeds (or a predetermined high percentage thereof) of the reference wheel 19 determined during the free-running periods of the wheel are used for updating the integrated accelerometer output so that a value representing the true speed of the vehicle becomes the initial speed value at the beginning of each period of prediction as shown in FIGS. 5–6.

The predicted and, if required, updated speed signal obtained in the above way is transmitted from the integrator 31 to the analogue gate 24 of that block 20 of the electronic unit 8, which is associated with the individual wheel 1, 19 and which calculates and indicates the instantaneous slip value as described above.

What we claim is:

1. A method of indicating in an electronic system controlling the brake means of a wheeled vehicle the slip of a wheel of the vehicle during braking and of controlling the braking effect of the wheel in dependence on said indication to prevent locking of the wheel, which comprises supplying information o the instantaneous speeds of said vehicle wheel, in the of of electrical magnitudes, to a block included in an electronic unit comprising an analogue gate and an integrator, integrating the electrical signal representing the speed of the vehicle during the interval between two pulse edges of pulses which represent the speed of the wheel, generating said pulses by a speed transducer in such manner that the input of the integrator corresponds to a voltage $$U_i = K_1 V$$

during an interval $T = K_2/v$, wherein $V$ is the predicted speed of the vehicle, $K_1$ and $K_2$ are constants and v is the actual speed of the wheel,
so that the output of the integrator corresponds to a voltage $$U_u = K_i K_1 K_2 V/v$$

wherein $K_i$ is a constant and
wherein $U_u$ is proportional to the ratio of the speed of the vehicle to that of the wheel and is a quantity to control the braking effect of the wheel in dependence on the slip of the wheel.

2. In an electronic system controlling the brake means of a wheeled vehicle, an arrangement indicating the slip of a wheel of the vehicle during braking to control the braking effect of the wheel in dependence on the slip of said wheel whereby locking of the wheel is prevented, said arrangement comprising
a block forming part of an electronic unit which block includes an analogue gate and an integrator adapted to operate during intervals conditionally controlled by said analogue gate to integrate an input representing the predicted vehicle speed during the interval between two pulse edges of pulses representing the speed of the wheel;
a speed transducer generating said pulses and feeding them to the analogue gate,
the input of the integrator being a voltage $U_i = K_1 V$ during an interval $T = K_2/v$, wherein $V$ is the predicted speed of the vehicle, $v$ is the speed of the appropriate wheel and $K_1$ and $K_2$ are constants,
so that the integrator output becomes a voltage $U_u = K_i K_1 K_2 V/v$, wherein $K_i$ is a constant and the output $U_u$ is proportional to the ratio of the speed of the vehicle to that of the wheel, this ratio having a digital numerator and an analogue denominator and being a quantity which is dependent on the slip of the wheel and controls the braking effect of the wheel.

* * * * *

UNITED STATES PATENT OFFICE
CERTIFICATE OF CORRECTION

Patent No. 3,709,565     Dated January 9, 1973

Inventor(s) Arne Holger Jonason & Gosta Holger Granlund

It is certified that error appears in the above-identified patent and that said Letters Patent are hereby corrected as shown below:

Claim 1, line 6, "o" should be -- of -- ; line 7, "of" (second occurrence) should be -- form -- .

Signed and sealed this 29th day of May 1973.

(SEAL)
Attest:

EDWARD M. FLETCHER, JR.
Attesting Officer

ROBERT GOTTSCHALK
Commissioner of Patents